3,308,928
APPARATUS FOR CAUSING ARTICLES SEPARATELY SUPPLIED BY GRIP MEANS TO BE DEPOSITED IN A ROW ONE AFTER ANOTHER
Jacob H. Mosterd, Stationsweg 117, Barneveld, Netherlands
Filed Mar. 17, 1965, Ser. No. 440,393
Claims priority, application Netherlands, Mar. 18, 1964, 64/02883
1 Claim. (Cl. 198—179)

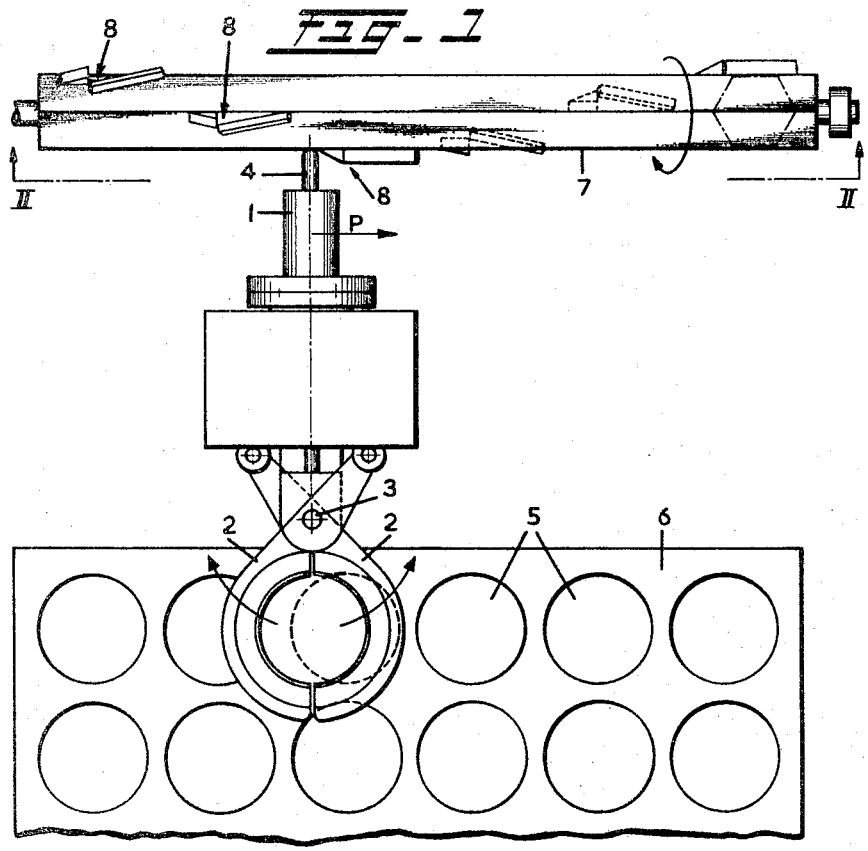
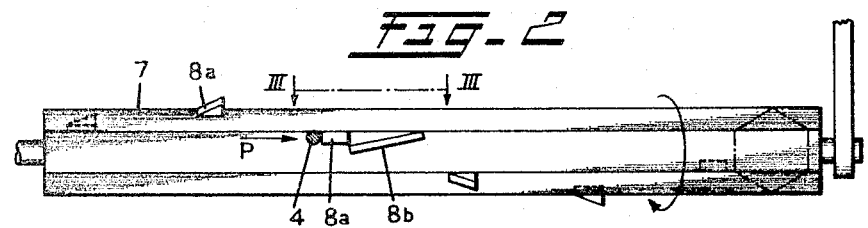
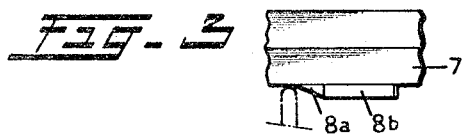

This invention relates to an apparatus for causing articles separately supplied by grip means to be deposited in a row one after another, for example, for use in depositing eggs, sorted according to weight, in the adjacent cells of an egg package having a plurality of mutually parallel rows of cells.

It is an object of the present invention to provide as simple a construction as possible for such an apparatus, by means of which the deposition may be effected in rapid succession.

To this effect, the apparatus according to the present invention comprises a plurality of grips spaced a given distance from each other and movable along at least one stepwise rotatable shaft, each of said grips having a cam for opening the associated grip, said rotatable shaft having a plurality of stops helically spaced about its periphery and of such a shape that upon contact of each cam with a stop such cam is actuated by the stop for opening its associated grip, and subsequently the stop is actuated by the cam for turning the shaft through part of a revolution.

One embodiment of the invention will be described, by way of example, with reference to the accompanying drawings, in which FIG. 1 is a diagrammatic plan view of the apparatus;
FIG. 2 is a vertical section on the line II—II in FIG. 1;
FIG. 3 is a plan view taken on the line III—III in FIG. 2.

Referring to the drawings, the apparatus comprises a series of randomly spaced grips 1 of which only one is shown for clarity, movable in a horizontal track in the direction of the arrow P, and having cup-shaped jaws 2, capable of enclosing an egg. The jaws 2 are mounted for hinging movement about a vertical shaft 3, and by pressing a cam 4 inwardly against the outward bias of spring means, the jaws can be moved apart to release an egg into one of the cells 5 of an egg package.

To control the order in which the eggs are deposited in the cells 5, the grips 1 move along a shaft 7, mounted for rotation, which, in the embodiment shown, has a hexagonal cross-sectional configuration, but, depending on the number of eggs to be deposited in one row, may have any other, regular, polygonal form, or may take the form of a right cylinder. The shaft 7 is provided with stops 8 helically spaced about its periphery.

Each stop 8 consists of two distinct parts 8a and 8b. The stop member 8a has such a bevel that the cam 4 of a grip 1 moving along the stop 8 is gradually impressed for opening the jaws 2 and depositing the egg supplied by the grip into the cell 5 of the egg package corresponding with the location of the stop.

When the grip 1 thus emptied proceeds along its path of travel, the cam 4 snaps off the high end of the member 8a is pressed outwardly under the action of the spring, and then contacts the upper surface of the member 8b. As the grip 1 is moving on in the direction of the arrow P, the member 8b is pressed downwardly, and as a result the shaft 7 is turned through such a part of a revolution that a next stop 8 is moved into the path of travel of a next cam 4. Suitable means are provided for fixing the shaft 7 in the new position.

Depending on whether the helix along which the stops are distributed on the periphery of the shaft 7 is left-handed or right-handed, the eggs supplied by the grips 1 are deposited in the cells 5 of the egg package 6 from right to left, as seen in FIG. 2, or from left to right.

The shaft 7 and the support for the egg package 6 may be so coupled that after a complete revolution of the shaft 7 the egg package 6 is shifted to a next position in which an empty row of cells is in position to receive eggs.

It will be evident that the number of stops 8 provided on a shaft 7 and the number of cells 5 per row of cells of the package must be in agreement with each other. If the machine has to deposit the articles in packages of different sizes, the apparatus according to the invention is preferably equipped with a holder carrying several shafts matching the size of the packages to be handled, so that a change from one type of packages to another may be effected in a simple manner.

It will be understood that the apparatus as described may be used for the deposition in rows of other articles than eggs. It will equally be understood that, although the principles of this invention have been described in the light of one specific embodiment, those skilled in the art can readily make alterations and modifications without departing from the scope of the invention as defined in and by the following claim.

I claim:

An apparatus for causing articles separately supplied by grip means to be deposited in a row one after another, comprising a grip, a stepwise rotatable shaft along which said grip is movable, a cam on said grip for opening said grip, and rotatable shaft having a plurality of stops helically spaced about its periphery so that upon contact of said cam with a stop said cam is actuated by said stop for opening said grip, and means on said top engaged by said cam for then turning said shaft through part of a revolution whereby when a plurality of grips are used they can successively unload articles in a consecutive series of predetermined locations.

References Cited by the Examiner
UNITED STATES PATENTS
1,645,600  10/1927  Kohler.
3,220,154  11/1965  Van Der Schoot _____ 53—246 X FOREIGN PATENTS
318,101  5/1930  Great Britain.

MARVIN A. CHAMPION, *Primary Examiner.*